United States Patent
Oh et al.

(10) Patent No.: US 9,743,022 B2
(45) Date of Patent: Aug. 22, 2017

(54) IMAGE SENSORS AND RELATED METHODS AND ELECTRONIC DEVICES

(71) Applicant: Samsung Electronics Co., Ltd., Suwon-Si, Gyeonggi-do (KR)

(72) Inventors: Min-Seok Oh, Osan-si (KR); Seung-Sik Kim, Hwaseong-si (KR); Young-Chan Kim, Seongnam-si (KR); Eun-Sub Shim, Anyang-si (KR); Dong-Joo Yang, Seongnam-si (KR); Ji-Won Lee, Daegu (KR); Moo-Sup Lim, Hwasung (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/851,396

(22) Filed: Sep. 11, 2015

(65) Prior Publication Data

US 2016/0100113 A1   Apr. 7, 2016

(30) Foreign Application Priority Data

Oct. 7, 2014 (KR) ........................ 10-2014-0134954

(51) Int. Cl.
*H04N 5/217* (2011.01)
*H04N 5/335* (2011.01)
*H04N 5/359* (2011.01)

(52) U.S. Cl.
CPC ................................ *H04N 5/3592* (2013.01)

(58) Field of Classification Search
CPC ........... H01L 27/14623; H01L 27/1464; H01L 27/14689; H01L 27/14609; H01L 27/14612; H01L 27/14643

USPC ............... 348/241, 243, 302, 308; 257/239; 250/208.1

See application file for complete search history.

(56) References Cited

U.S. PATENT DOCUMENTS

| | | | |
|---|---|---|---|
| 7,414,233 | B2 | 8/2008 | Asaba |
| 7,737,388 | B2 | 6/2010 | Altice, Jr. et al. |
| 2008/0024640 | A1 | 1/2008 | Izawa |
| 2010/0188536 | A1 | 7/2010 | Hasuka et al. |

(Continued)

FOREIGN PATENT DOCUMENTS

| | | |
|---|---|---|
| JP | 05-227486 | 9/1993 |
| JP | 06-261254 | 9/1994 |

(Continued)

*Primary Examiner* — Trung Diep
(74) *Attorney, Agent, or Firm* — Ward and Smith, P.A.

(57) ABSTRACT

An image sensor is provided including a pixel array, a correlated double sampling (CDS) unit, an analog-digital converting (ADC) unit, a control unit, and an overflow power voltage control unit. The pixel array includes at least one unit pixel that generates accumulated charges corresponding to incident light in a photoelectric conversion period and outputs an analog signal based on the accumulated charges in a readout period. The CDS unit generates an image signal by performing a CDS operation on the analog signal. An ADC unit converts the image signal into a digital signal. A control unit controls the pixel array, the CDS unit, and the ADC unit. An overflow power voltage control unit controls an overflow power voltage to have a low voltage level in the photoelectric conversion period and controls the overflow power voltage to have a high voltage level in the readout period.

20 Claims, 13 Drawing Sheets

(56) References Cited

U.S. PATENT DOCUMENTS

| | | | | |
|---|---|---|---|---|
| 2011/0121162 A1* | 5/2011 | Murata | ............ | H01L 27/14603 |
| | | | | 250/208.1 |
| 2012/0193516 A1* | 8/2012 | Bogaerts | ............ | H01L 27/1461 |
| | | | | 250/208.1 |
| 2012/0326008 A1* | 12/2012 | McKee | ............ | H04N 5/37452 |
| | | | | 250/208.1 |

FOREIGN PATENT DOCUMENTS

| | | |
|---|---|---|
| JP | 2013-183380 | 9/2013 |
| JP | 2013-187872 | 9/2013 |
| JP | 2014-022689 | 2/2014 |
| KR | 10-0218270 B1 | 6/1999 |
| KR | 10-0660866 B1 | 12/2006 |
| KR | 10-0849509 B1 | 7/2008 |
| KR | 10-1377063 B1 | 3/2014 |

* cited by examiner

IMAGE SENSORS AND RELATED METHODS AND ELECTRONIC DEVICES

CROSS-REFERENCE TO RELATED APPLICATION

This application claims priority under 35 USC §119 to Korean Patent Application No. 10-2014-0134954, filed Oct. 7, 2014, the contents of which are hereby incorporated herein by reference as if set forth in its entirety.

FIELD

Embodiments of the inventive concept relate generally to electronic devices and, more particularly, to global shutter image sensors.

BACKGROUND

An image sensor is a semiconductor device that converts a photo image, for example, light reflected by a subject, into an electric signal. Thus, image sensors are widely used in portable electronic devices, such as digital cameras, cellular phones, and the like. Generally, image sensors can be classified into charged coupled device (CCD) image sensors and complementary metal oxide semiconductor (CMOS) image sensors. Recently, CMOS image sensors have received more attention compared to CCD image sensors due to advantages, such as low manufacturing costs, low power consumption, ease of integration with peripheral circuits, and the like. Furthermore, CMOS image sensors may be classified into rolling shutter CMOS image sensors and global shutter CMOS image sensors. Studies have been performed on global shutter CMOS image sensors because, for example, image distortion, such as motion blur, jello effect, etc., of global shutter CMOS image sensors may be less than that of rolling shutter CMOS image sensors. Generally, a unit pixel included in the global shutter CMOS image sensor includes an overflow transistor that reduced the likelihood of overflow occurring in a photoelectric conversion device in a readout period. However, in a unit pixel included in conventional global shutter CMOS image sensors, image quality degradation may be caused because a leakage current due to hot carrier generation flows into the photoelectric conversion device, for example, a photodiode, etc., through the overflow transistor even when the overflow transistor is turned off in a photoelectric conversion period.

SUMMARY

Some embodiments of the present inventive concept provide an image sensor capable of reducing image quality degradation caused by a leakage current due to hot carrier generation flowing into a photoelectric conversion device through an overflow transistor of each unit pixel even when the overflow transistor is turned off in a photoelectric conversion period of the image sensor.

In further embodiments, a portable electronic device may be provided including the image sensor.

In still further embodiments, a method is provided for driving an image sensor capable of preventing image quality degradation caused by a leakage current due to hot carrier generation flowing into a photoelectric conversion device through an overflow transistor of each unit pixel even when the overflow transistor is turned off in a photoelectric conversion period of the image sensor.

Some embodiments of the present inventive concept provides an image sensor including a pixel array including at least one unit pixel that generates accumulated charges corresponding to incident light in a photoelectric conversion period and that outputs an analog signal based on the accumulated charges in a readout period, a correlated double sampling unit configured to generate an image signal by performing a correlated double sampling operation on the analog signal, an analog-digital converting unit configured to convert the image signal into a digital signal, a control unit configured to control the pixel array, the correlated double sampling unit, and the analog-digital converting unit, and an overflow power voltage control unit configured to control an overflow power voltage applied to the unit pixel to have a low voltage level in the photoelectric conversion period and to control the overflow power voltage to have a high voltage level in the readout period.

In further embodiments, the overflow power voltage control unit may be inside the control unit.

In still further embodiments, the overflow power voltage control unit may control the overflow power voltage to have the low voltage level in a non-readout period other than the readout period.

In some embodiments, the image sensor may further include a digital signal processing unit configured to output a final image signal by performing a digital signal processing on the digital signal.

In further embodiments, the unit pixel may include a photoelectric conversion block configured to generate the accumulated charges in the photoelectric conversion period, an analog signal output block configured to output the analog signal based on the accumulated charges in the readout period, and an overflow prevention block configured to prevent an overflow from occurring in the photoelectric conversion block by using the overflow power voltage in the readout period.

In still further embodiments, the overflow prevention block may include an overflow transistor connected between the overflow power voltage and the photoelectric conversion block and configured to operate based on an overflow signal.

In some embodiments, a voltage level of the overflow power voltage may be changed from the low voltage level to the high voltage level at a timing point at which the overflow transistor is turned on based on the overflow signal in the unit pixel.

In further embodiments, a voltage level of the overflow power voltage may be changed from the low voltage level to the high voltage level at a timing point that is earlier than a timing point at which the overflow transistor is turned on based on the overflow signal in the unit pixel.

In still further embodiments, a voltage level of the overflow power voltage may be changed from the low voltage level to the high voltage level at respective timing points that are earlier than a timing point at which the overflow transistor is turned on based on the overflow signal in respective pixel groups.

In some embodiments, the photoelectric conversion block may include a photoelectric conversion device configured to convert the incident light into charges and to generate the accumulated charges by accumulating the charges, a charge storage device configured to store the accumulated charges, a first transfer transistor connected between the photoelectric conversion device and the charge storage device and configured to operate based on a first transfer signal, and a second transfer transistor connected between the charge storage device and a floating diffusion node of the analog signal output block and configured to operate based on a second transfer signal.

In further embodiments, the photoelectric conversion device may be a photodiode, a phototransistor, or a pinned photodiode. Furthermore, the charge storage device may be a storage diode.

In still further embodiments, the analog signal output block may include a reset transistor connected between the floating diffusion node and a first high power voltage and configured to operate based on a reset signal, a sensing transistor connected to a second high power voltage and configured to operate based on the accumulated charges that are transferred to the floating diffusion node, and a select transistor connected between the sensing transistor and an output terminal and configured to operate based on a row select signal.

In some embodiments, the high voltage level may be substantially the same as a voltage level of the second high power voltage when the overflow power voltage has the high voltage level.

In further embodiments, the low voltage level may be substantially the same as a voltage level of a ground voltage when the overflow power voltage has the low voltage level.

In still further embodiments, a voltage level of the first high power voltage may be substantially the same as a voltage level of the second high power voltage.

Some embodiments of the present inventive concept provide a portable electronic device including a global shutter image sensor, a display device configured to display an image based on a final image signal input from the global shutter image sensor, and a processor configured to control the global shutter image sensor and the display device. In these embodiments, the global shutter image sensor may include a pixel array including at least one unit pixel that generates accumulated charges corresponding to incident light in a photoelectric conversion period and that outputs an analog signal based on the accumulated charges in a readout period, a correlated double sampling unit configured to generate an image signal by performing a correlated double sampling operation on the analog signal, an analog-digital converting unit configured to convert the image signal into a digital signal, a control unit configured to control the pixel array, the correlated double sampling unit, and the analog-digital converting unit, and an overflow power voltage control unit configured to control an overflow power voltage applied to the unit pixel to have a low voltage level in the photoelectric conversion period and to control the overflow power voltage to have a high voltage level in the readout period.

In further embodiments, the overflow power voltage control unit may be inside the control unit.

In still further embodiments, the overflow power voltage control unit may control the overflow power voltage to have the low voltage level in a non-readout period other than the readout period.

In some embodiments, the unit pixel may include a photoelectric conversion device configured to convert the incident light into charges and to generate the accumulated charges by accumulating the charges, a charge storage device configured to store the accumulated charges, a first transfer transistor connected between the photoelectric conversion device and the charge storage device and configured to operate based on a first transfer signal, a second transfer transistor connected between the charge storage device and a floating diffusion node and configured to operate based on a second transfer signal, a reset transistor connected between the floating diffusion node and a first high power voltage and configured to operate based on a reset signal, a sensing transistor connected to a second high power voltage and configured to operate based on the accumulated charges that are transferred to the floating diffusion node, a select transistor connected between the sensing transistor and an output terminal and configured to operate based on a row select signal, and an overflow transistor connected between the overflow power voltage and the photoelectric conversion device and configured to operate based on an overflow signal.

In further embodiments, a voltage level of the overflow power voltage may be changed from the low voltage level to the high voltage level at a timing point at which the overflow transistor is turned on based on the overflow signal in the unit pixel.

In still further embodiments, a voltage level of the overflow power voltage may be changed from the low voltage level to the high voltage level at a timing point that is earlier than a timing point at which the overflow transistor is turned on based on the overflow signal in the unit pixel.

In some embodiments, a voltage level of the overflow power voltage may be changed from the low voltage level to the high voltage level at respective timing points that are earlier than a timing point at which the overflow transistor is turned on based on the overflow signal in respective pixel groups.

In further embodiments, the high voltage level may be substantially the same as a voltage level of the second high power voltage when the overflow power voltage has the high voltage level. Furthermore, the low voltage level may be substantially the same as a voltage level of a ground voltage when the overflow power voltage has the low voltage level.

In still further embodiments, a voltage level of the first high power voltage may be substantially the same as a voltage level of the second high power voltage.

Some embodiments provide a method of driving an image sensor in which each unit pixel transfers accumulated charges generated by a photoelectric conversion device to a floating diffusion node through a charge storage device includes an operation of controlling an overflow power voltage applied to an electrode of an overflow transistor included in each unit pixel to have a low voltage level in a photoelectric conversion period of the image sensor and an operation of controlling the overflow power voltage to have a high voltage level in a readout period of the image sensor.

In further embodiments, the method further includes an operation of controlling the overflow power voltage to have the low voltage level in a non-readout period of the image sensor other than the readout period of the image sensor.

Therefore, an image sensor according to example embodiments may prevent image quality degradation caused by a leakage current due to hot carrier generation flowing into a photoelectric conversion device through an overflow transistor even when the overflow transistor is turned off in a photoelectric conversion period of the image sensor by controlling an overflow power voltage applied to an electrode of the overflow transistor included in each unit pixel to have a low voltage level in the photoelectric conversion period of the image sensor and by controlling the overflow power voltage to have a high voltage level in a readout period of the image sensor.

Furthermore, a portable electronic device according to example embodiments may output a high-quality image by including the image sensor.

Furthermore, a method of driving an image sensor according to example embodiments may prevent image quality degradation caused by a leakage current due to hot carrier generation flowing into a photoelectric conversion device through an overflow transistor even when the overflow transistor is turned off in a photoelectric conversion period of the image sensor by controlling an overflow power voltage applied to an electrode of the overflow transistor included in each unit pixel to have a low voltage level in the photoelectric conversion period of the image sensor and by controlling the overflow power voltage to have a high voltage level in a readout period of the image sensor.

BRIEF DESCRIPTION OF THE DRAWINGS

Illustrative, non-limiting example embodiments will be more clearly understood from the following detailed description in conjunction with the accompanying drawings.

DETAILED DESCRIPTION OF THE EMBODIMENTS

Figure 1:
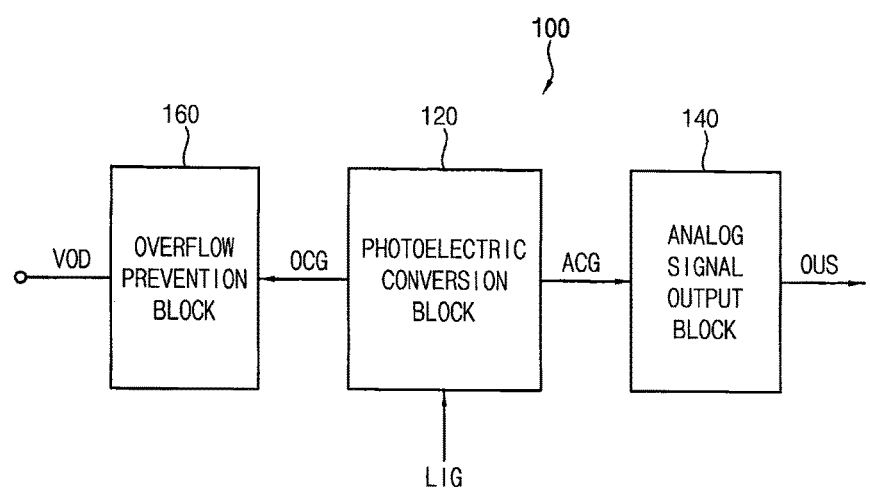
FIG. 1 is a block diagram illustrating a unit pixel included in an image sensor, for example, a global shutter image sensor, according to some embodiments of the present inventive concept.

Various example embodiments will be described more fully with reference to the accompanying drawings, in which some example embodiments are shown. The present inventive concept may, however, be embodied in many different forms and should not be construed as limited to the embodiments set forth herein. Rather, these embodiments are provided so that this disclosure will be thorough and complete, and will fully convey the scope of the present inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
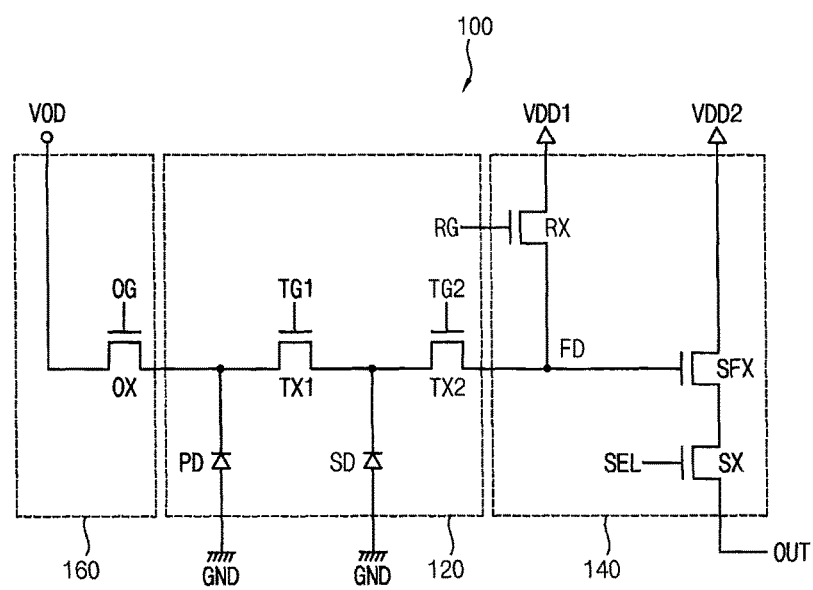
FIG. 2 is a circuit diagram illustrating the unit pixel of FIG. 1 according to some embodiments of the present inventive concept.

FIG. 1 is a block diagram illustrating a unit pixel included in an image sensor, for example, a global shutter image sensor, according to some embodiments of the present inventive concept. FIG. 2 is a circuit diagram illustrating an example of the unit pixel of FIG. 1. Referring now to FIGS. 1 and 2, the unit pixel 100 included in the global shutter image sensor may include a photoelectric conversion block 120, an analog signal output block 140, and an overflow prevention block 160.

The photoelectric conversion block 120 may receive incident light LIG to generate accumulated charges ACG in a photoelectric conversion period of the image sensor. In some embodiments, as illustrated in FIG. 2, the photoelectric conversion block 120 may include a photoelectric conversion device PD, a charge storage device SD, a first transfer transistor TX1, and a second transfer transistor TX2. In particular, the photoelectric conversion device PD may receive the incident light LIG to convert the incident light LIG into charges and may accumulate the charges to generate the accumulated charges ACG. As further illustrated in FIG. 2, the photoelectric conversion device PD may include a first electrode connected to a low power voltage GND and a second electrode connected to a first electrode of the first transfer transistor TX1. For example, the low power voltage GND may be a ground voltage. However, the low power voltage GND is not limited thereto. In some embodiments, the photoelectric conversion device PD may be, for example, a photodiode, a phototransistor, a pinned photodiode, and the like. Furthermore, the second electrode of the photoelectric conversion device PD may be connected to a first electrode of an overflow transistor OX. The charge storage device SD may store the accumulated charges ACG that are generated by the photoelectric conversion device PD. In other words, when the accumulated charges ACG are transferred from the photoelectric conversion device PD to the charge storage device SD as the first transfer transistor TX1 is turned on, the charge storage device SD may store the accumulated charges ACG until the second transfer transistor TX2 is turned on. The charge storage device SD may include a first electrode connected to the low power voltage GND and a second electrode connected between a second electrode of the first transfer transistor TX1 and a first electrode of the second transfer transistor TX2. In some embodiments, the charge storage device SD may be, for example, a storage diode.

The first transfer transistor TX1 may be connected between the photoelectric conversion device PD and the charge storage device SD. The first transfer transistor TX1 may operate based on a first transfer signal TG1. In particular, the first transfer transistor TX1 may include the first electrode connected to the second electrode of the photoelectric conversion device PD, the second electrode connected to the second electrode of the charge storage device SD, and a gate electrode to which the first transfer signal TG1 is applied. When the first transfer signal TG1 has a first voltage level, for example, logic 'high' level, the first transfer transistor TX1 may be turned on. Thus, the accumulated charges ACG generated by the photoelectric conversion device PD may be transferred to the charge storage device SD. The second transfer transistor TX2 may be connected between the charge storage device SD and a floating diffusion node FD. The second transfer transistor TX2 may operate based on a second transfer signal TG2. In particular, the second transfer transistor TX2 may include the first electrode connected to the second electrode of the charge storage device SD, a second electrode connected to the floating diffusion node FD, and a gate electrode to which the second transfer signal TG2 is applied. When the second transfer signal TG2 has a first voltage level, for example, a logic 'high' level, the second transfer transistor TX2 may be turned on. Thus, the accumulated charges ACG stored in the charge storage device SD may be transferred to the floating diffusion node FD of the analog signal output block 140.

The analog signal output block 140 may output an analog signal OUS based on the accumulated charges ACG in a readout period of the image sensor. In some embodiments, as illustrated in FIG. 2, the analog signal output block 140 may include a reset transistor RX, a sensing transistor SFX, and a select transistor SX. The reset transistor RX may be connected between the floating diffusion node FD and a first high power voltage VDD1. The reset transistor RX may operate based on a reset signal RG. In particular, the reset transistor RX may include a first electrode connected to the first high power voltage VDD1, a second electrode connected to the floating diffusion node FD, and a gate electrode to which the reset signal RG is applied. When the reset signal RG has a first voltage level, for example, a logic 'high' level, the reset transistor RX may be turned on. Thus, the floating diffusion node FD, the charge storage device SD, and/or the photoelectric conversion device PD may be reset or, initialized. The sensing transistor SFX may be connected between a second high power voltage VDD2 and a select transistor SX. The sensing transistor SFX may operate based on the accumulated charges ACG that are transferred to the floating diffusion node FD. In particular, the sensing transistor SFX may include a first electrode connected to a second high power voltage VDD2, a second electrode connected to a first electrode of the select transistor SX, and a gate electrode connected to the floating diffusion node FD. Thus, the sensing transistor SFX may be turned on based on the accumulated charges ACG that are transferred to the floating diffusion node FD. In some embodiments, a voltage level the first high power voltage VDD1 may be substantially the same as a voltage level of the second high power voltage VDD2. In some embodiments, a voltage level the first high power voltage VDD1 may be different from a voltage level of the second high power voltage VDD2. The select transistor SX may be connected between an output terminal OUT and the sensing transistor SFX. The select transistor SX may operate based on a row select signal SEL. In particular, the select transistor SX may include the first electrode connected to the second electrode of the sensing transistor SFX, a second electrode connected to the output terminal OUT, and a gate electrode to which the row select signal SEL is applied. When the row select signal SEL has a first voltage level, for example, a logic 'high' level, the select transistor SX may be turned on. Thus, an electric signal corresponding to the accumulated charges ACG that are transferred to the floating diffusion node FD, for example, the analog signal OUS, may be output at the output terminal OUT when the select transistor SX is turned on.

The overflow prevention block 160 may reduce the likelihood, or possibly prevent, an overflow from occurring in the photoelectric conversion block, for example, the photoelectric conversion device PD of the photoelectric conversion block 120, based on an overflow power voltage VOD in the readout period of the image sensor. In some embodiments, as illustrated in FIG. 2, the overflow prevention block 160 may include an overflow transistor OX. The overflow transistor OX may be connected between the overflow power voltage VOD and the photoelectric conversion device PD. The overflow transistor OX may operate based on an overflow signal OG. In particular, the overflow transistor OX may include the first electrode, for example, a source electrode, connected to the second electrode of the photoelectric conversion device PD, a second electrode, for example, a drain electrode, connected to the overflow power voltage VOD, and a gate electrode to which the overflow signal QG is applied. In these embodiments, the overflow power voltage VOD may be applied via a metal line extended from the second electrode of the overflow transistor OX or connected to the second electrode of the overflow transistor OX. Generally, the overflow transistor OX may be turned off in the photoelectric conversion period of the image sensor and may be turned on in the readout period of the image sensor. In other words, the overflow signal OG may have a first voltage level, for example, a logic 'high' level, in the readout period of the image sensor and may have a second voltage level, for example, a logic 'low' level, in the photoelectric conversion period of the image sensor. Thus, the overflow prevention block 160 may reduce the likelihood, or possibly prevent, an overflow from occurring in the photoelectric conversion block 120 based on the overflow power voltage VOD in the readout period of the image sensor. On the other hand, the overflow prevention block 160 may not affect a photoelectric conversion operation of the photoelectric conversion block 120 in the photoelectric conversion period of the image sensor because the overflow transistor OX of the overflow prevention block 160 is turned off in the photoelectric conversion period of the image sensor. Although it is illustrated in FIG. 2 that the first transfer transistor TX1, the second transfer transistor TX2, the reset transistor RX, the sensing transistor SFX, the select transistor SX, and the overflow transistor OX are implemented by N-channel metal oxide semiconductor (NMOS) transistors, embodiments of the present inventive concept are not limited to this configuration. For example, In some embodiments, the first transfer transistor TX1, the second transfer transistor TX2, the reset transistor RX, the sensing transistor SFX, the select transistor SX, and the overflow transistor OX may be implemented by P-channel metal oxide semiconductor (PMOS) transistors without departing from the scope of the present inventive concept.

In a conventional unit pixel, image quality degradation may be caused because a leakage current due to hot carrier generation flows into the photoelectric conversion device PD through the overflow transistor OX even when the overflow transistor OX is turned off in the photoelectric conversion period of the image sensor. The unit pixel 100 in accordance with embodiments discussed herein may reduce the likelihood, or possibly prevent, an overflow from occurring in the photoelectric conversion device PD in the readout period of the image sensor because the unit pixel 100 includes the overflow transistor OX that receives the overflow power voltage VOD.

For example, as illustrated in FIG. 2, since the overflow transistor OX is turned off in the photoelectric conversion period of the image sensor, the overflow signal OG may have a negative voltage level, for example, −1.2V. In these embodiments, if the overflow power voltage VOD has a fixed voltage level, for example, 4.5V, like the conventional unit pixel, the leakage current due to the hot carrier generation may flow into the photoelectric conversion device PD through the overflow transistor OX. To address this issue, in the unit pixel 100, the overflow power voltage VOD applied to the overflow transistor OX, for example, the second electrode of the overflow transistor OX, may be changed according to an operating period of the image sensor. The overflow power voltage VOD applied to the second electrode, for example, the drain electrode, of the overflow transistor OX may have a low voltage level in the photoelectric conversion period of the image sensor. The overflow power voltage VOD applied to the second electrode of the overflow transistor OX may have a high voltage level in the readout period of the image sensor. In some embodiments, a high voltage level of the overflow power voltage VOD may be substantially the same as a voltage level of the second high power voltage VDD2, and a low voltage level of the overflow power voltage VOD may be substantially the same as a voltage level of the ground voltage. However, the overflow power voltage VOD is not limited thereto. In the unit pixel 100, the overflow transistor OX may be turned off in the photoelectric conversion period of the image sensor, and the overflow power voltage VOD applied to the second electrode of the overflow transistor OX may have a low voltage level. As a result, the likelihood that the leakage current will flow into the photoelectric conversion device PD through the overflow transistor OX may be reduced. Although it is discussed above that the operating period of the image sensor includes the photoelectric conversion period and the readout period, the operating period of the image sensor is not limited thereto. In some embodiments, the operating period of the image sensor may include the readout period and a non-readout period that includes the photoelectric conversion period and any other periods. In these embodiments, the overflow power voltage VOD may have a low voltage level in the non-readout period of the image sensor, and the overflow power voltage VOD may have a high voltage level in the readout period of the image sensor.

Figure 3:
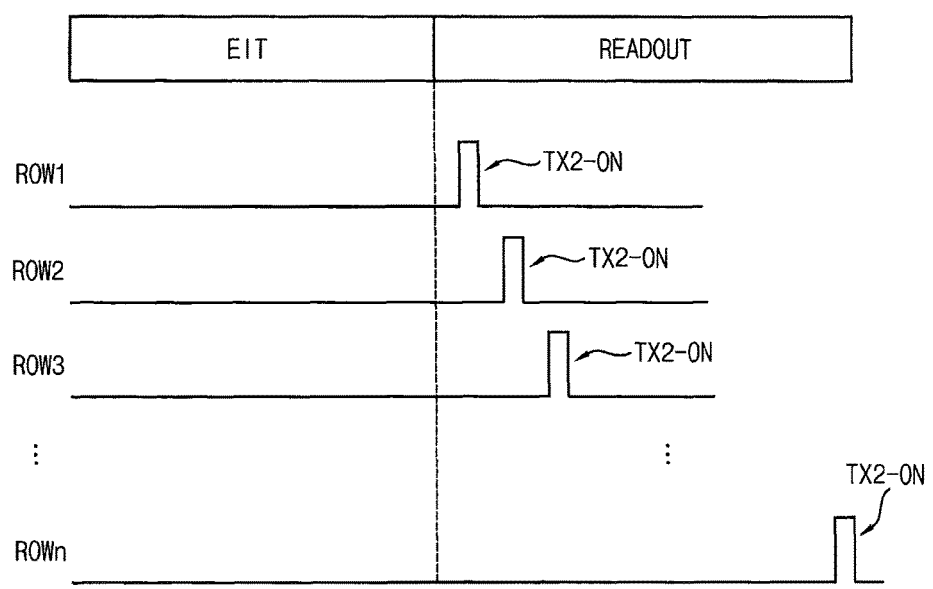
FIG. 3 is a timing diagram illustrating an example in which the unit pixel of FIG. 1 operates in a photoelectric conversion period and a readout period of the image sensor according to some embodiments of the present inventive concept.

Referring now to FIG. 3, a timing diagram illustrating an example in which the unit pixel of FIG. 1 operates in a photoelectric conversion period and a readout period of the image sensor will be discussed. Referring to FIGS. 1 through 3, the unit pixels included in the image sensor may operate in the photoelectric conversion period EIT and the readout period READOUT of the image sensor. As discussed above, in the photoelectric conversion period EIT of the image sensor, the accumulated charges ACG may be concurrently generated by the photoelectric conversion devices PD of the unit pixels 100. Subsequently, when the first transfer signal TG1 having a first voltage level, for example, a logic 'high' level, is concurrently applied to the unit pixels 100, the accumulated charges ACG generated by the photoelectric conversion devices PD may be concurrently transferred to the charge storage devices SD of the unit pixels 100. Thus, the accumulated charges ACG generated by the photoelectric conversion devices PD may be stored in the charge storage devices SD of the unit pixels 100.

In the readout period READOUT of the image sensor, the accumulated charges ACG stored in the charge storage devices SD may be sequentially transferred to the floating diffusion nodes FD of the unit pixels 100 according to scan sequences of the unit pixels 100. In other words, the second transfer signal TG2 having a first voltage level, for example, a logic 'high' level, may be sequentially applied to the unit pixels 100 (indicated as TX2-ON) according to scan sequences of the unit pixels 100. As a result, an electric signal corresponding to the accumulated charges ACG stored in the charge storage device SD (an analog signal OUS) may be sequentially output from the unit pixels 100 according to scan sequences of the unit pixels 100 in the readout period READOUT of the image sensor.

As discussed above, an operating period of the image sensor may be classified into the photoelectric conversion period EIT and the readout period READOUT. Thus, a photoelectric conversion operation may be concurrently performed in the unit pixels 100 in the photoelectric conversion period EIT of the image sensor, and a readout operation may be sequentially performed in the unit pixels 100 according to scan sequences of the unit pixels 100 in the readout period READOUT of the image sensor. In these embodiments, the photoelectric conversion period EIT and the readout period READOUT of the image sensor may be divided based on a timing point at which the accumulated charges ACG generated by the photoelectric conversion devices PD are concurrently stored in the charge storage devices SD as the first transfer signal TG1 having a first voltage level, for example, a logic 'high' level, is concurrently applied to the unit pixels 100 (as the first transfer transistors TX1 of the unit pixels 100 are concurrently turned on). Thus, after the accumulated charges ACG generated by the photoelectric conversion devices PD are concurrently stored in the charge storage devices SD as the first transfer signal TG1 having a first voltage level, for example, a logic 'high' level, is concurrently applied to the unit pixels 100, the first transfer signal TG1 having a second voltage level, a logic 'low' level, may be concurrently applied to the unit pixels 100 (the first transfer transistors TX1 of the unit pixels 100 may be concurrently turned off). As a result, in the readout period READOUT of the image sensor, the photoelectric conversion device PD may be separated from the charge storage device SD by the first transfer transistor TX1 in the unit pixel 100 included in the image sensor.

In the readout period READOUT of the image sensor, since the photoelectric conversion device PD is not blocked from the incident light LIG, the charges may be generated by the photoelectric conversion device PD. Thus, a light noise may be caused because the charges flow into the charge storage device SD through the first transfer transistor TX1 even when the first transfer transistor TX1 is turned off. For this reason, in the readout period READOUT of the image sensor, the overflow signal OG having a first voltage level, for example, a logic 'high' level, may be applied to the gate electrode of the overflow transistor OX (the overflow transistor OX may be turned on). Thus, the charges generated by the photoelectric conversion device PD in the readout period READOUT of the image sensor may be discharged (or, eliminated) through the overflow transistor OX in the unit pixel 100. In other words, the unit pixel 100 may reduce the likelihood of an overflow in the photoelectric conversion device PD in the readout period READOUT of the image sensor. To this end, the overflow power voltage VOD may be controlled to have a high voltage level in the readout period READOUT of the image sensor in the unit pixel 100. As a result, the charges generated by the photoelectric conversion device PD may be easily discharged through the overflow transistor OX. On the other hand, the charges generated by the photoelectric conversion device PD should not be discharged through the overflow transistor OX in the photoelectric conversion period EIT of the image sensor. Thus, in the photoelectric conversion period EIT of the image sensor, the overflow signal OG having a second voltage level, for example, a logic 'low' level, may be applied to the gate electrode of the overflow transistor OX (the overflow transistor OX may be turned off). However, even when the overflow signal OG having a second voltage level, for example, a logic 'low' level, is applied to the gate electrode of the overflow transistor OX, the leakage current due to the hot carrier generation may flow into the photoelectric conversion device PD if the overflow power voltage VOD has a high voltage level. For this reason, the overflow power voltage VOD may be controlled to have a low voltage level in the photoelectric conversion period EIT of the image sensor in the unit pixel 100. As a result, the leakage current due to the hot carrier generation may be reduced (or prevented) because the hot carrier generation in the overflow transistor OX is suppressed (or prevented).

Figure 4:
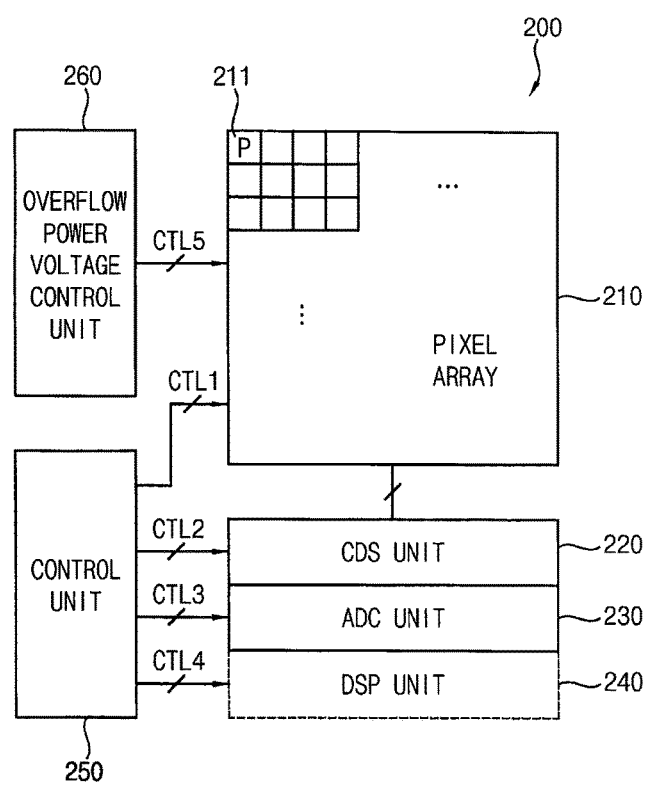
FIG. 4 is a block diagram illustrating an image sensor, for example, a global shutter image sensor, according to some embodiments of the present inventive concept.
Figure 5:
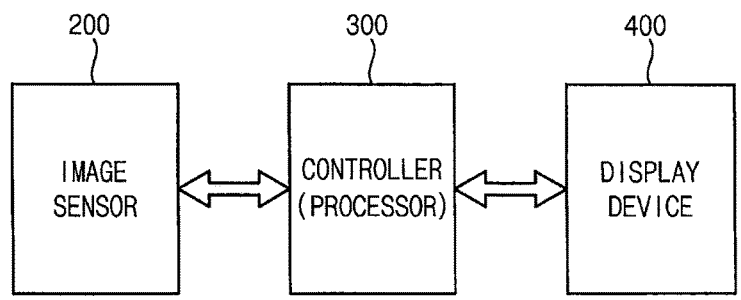
FIG. 5 is a block diagram illustrating an example in which the image sensor of FIG. 4 is connected to a display device via a controller according to some embodiments of the present inventive concept.

FIG. 4 is a block diagram illustrating an image sensor, for example, a global shutter image sensor, according to some embodiments of the present inventive concept. FIG. 5 is a block diagram illustrating an example in which the image sensor of FIG. 4 is connected to a display device via a controller.

Referring to FIGS. 4 and 5, the image sensor 200 may include a pixel array 210, a correlated double sampling (CDS) unit 220, an analog-digital converting (ADC) unit 230, a control unit 250, and an overflow power voltage control unit 260. In some embodiments, the image sensor 200 may further include a digital signal processing (DSP) unit 240. In these embodiments, the image sensor 200 may be a global shutter image sensor of which a unit pixel 211 transfers accumulated charges generated by a photoelectric conversion device to a floating diffusion node through a charge storage device.

The pixel array 210 may include the unit pixel 211 that generates the accumulated charges corresponding to incident light in a photoelectric conversion period of the image sensor 200 and outputs an electric signal (an analog signal) based on the accumulated charges in a readout period of the image sensor 200. In some embodiments, the unit pixel 211 may include the photoelectric conversion device, the charge storage device, a first transfer transistor, a second transfer transistor, a reset transistor, a sensing transistor, a select transistor, and an overflow transistor. The photoelectric conversion device may convert the incident light into charges and may generate the accumulated charges by accumulating the charges. The charge storage device may store the accumulated charges generated by the photoelectric conversion device. The first transfer transistor may be connected between the photoelectric conversion device and the charge storage device. The first transfer transistor may operate based on a first transfer signal. The second transfer transistor may be connected between the charge storage device and the floating diffusion node. The second transfer transistor may operate based on a second transfer signal. The reset transistor may be connected between the floating diffusion node and a first high power voltage. The reset transistor may operate based on a reset signal. The sensing transistor may be connected to a second high power voltage. The sensing transistor may operate based on the accumulated charges that are transferred to the floating diffusion node. The select transistor may be connected between the sensing transistor and an output terminal. The select transistor may operate based on a row select signal. The overflow transistor may be connected between an overflow power voltage and the photoelectric conversion device. The overflow transistor may operate based on an overflow signal. In some embodiments, the photoelectric conversion device may be a photodiode, a phototransistor, a pinned photodiode, or the like. The charge storage device may be, for example, a storage diode. Since the unit pixel 211 of the pixel array 210 is discussed above with reference to FIGS. 1 through 3 details with respect thereto will not be repeated herein in the interest of brevity.

The correlated double sampling unit 220 may generate an image signal by performing a correlated double sampling operation on the analog signal output from the unit pixel 211. In other words, the correlated double sampling unit 220 may perform a correlated double sampling operation by which an effective signal component is extracted based on a reset component and a signal component that are output from the unit pixel 211 in the readout period of the image sensor 200. The analog-digital converting unit 230 may convert the image signal into a digital signal. For this operation, the analog-digital converting unit 230 may include a plurality of analog-digital converters. The analog-digital converting unit 230 may perform a sequential analog-digital converting operation or a parallel analog-digital converting operation when the analog-digital converting unit 230 converts the analog signal (the image signal) into the digital signal. In some embodiments, as illustrated in FIG. 4, the correlated double sampling unit 220 may be located outside the analog-digital converting unit 230. In some embodiments, the correlated double sampling unit 220 may be located inside the analog-digital converting unit 230. Meanwhile, the correlated double sampling unit 220 and the analog-digital converting unit 230 may sequentially or concurrently operate. For example, the correlated double sampling unit 220 may perform an analog correlated double sampling operation for extracting a difference between the signal component and the reset component that are output from the unit pixel 211. For example, the correlated double sampling unit 220 may convert the signal component and the reset component that are output from the unit pixel 211 into respective digital signals and may perform a digital correlated double sampling operation for extracting a difference between the digital signals. For example, the correlated double sampling unit 220 may perform a dual correlated double sampling operation including both an analog correlated double sampling operation and a digital correlated double sampling operation.

The control unit 250 may control the pixel array 210, the correlated double sampling unit 220 and the analog-digital converting unit 230 (indicated as CTL1, CTL2, and CTL3). For this operation, the control unit 250 may generate various signals, for example, a clock signal, a timing control signal, and the like, that are used for operations of the pixel array 210, the correlated double sampling unit 220 and the analog-digital converting unit 230. However, for convenience of description, the control unit 250 is briefly illustrated (simplified) in FIG. 4. For example, the control unit 250 may include a vertical scan circuit, a horizontal scan circuit, a voltage generating circuit, and the like. The vertical scan circuit may control a row addressing operation and a row scan operation of the pixel array 210. The horizontal scan circuit may control a column addressing operation and a column scan operation of the pixel array 210. The voltage generating circuit may generate a plurality of voltages that are used by the analog-digital converting unit 230. For example, the voltage generating circuit may include a logic control circuit, a phase locked loop (PLL), a timing control circuit, a communication interface circuit, etc. In some embodiments, when the image sensor 200 includes the digital signal processing unit 240, the control unit 250 may also control the digital signal processing unit 240 (indicated as CTL4). The digital signal processing unit 240 may perform a digital signal processing on the digital signal to output a final image signal. For example, the digital signal processing unit 240 may perform an image interpolation, a color correction, a white balance, a gamma correction, a color conversion, and the like.

As discussed above, the overflow power voltage applied to an electrode of the overflow transistor included in the unit pixel 211 may have a low voltage level in the photoelectric conversion period of the image sensor 200. Furthermore, the overflow power voltage applied to the electrode of the overflow transistor included in the unit pixel 211 may have a high voltage level in the readout period of the image sensor 200. In these embodiments, the overflow power voltage may be applied via a metal line extended from the electrode, for example, a drain electrode, of the overflow transistor or connected to the electrode of the overflow transistor. The overflow power voltage control unit 260 may control the overflow power voltage applied to the unit pixels 211 to have a low voltage level in the photoelectric conversion period of the image sensor 200 (indicated as CTL5) and may control the overflow power voltage applied to the unit pixels 211 to have a high voltage level in the readout period of the image sensor 200 (indicated as CTL5). In some embodiments, the overflow power voltage control unit 260 may control the overflow power voltage applied to the unit pixels 211 to have a low power voltage in a non-readout period (including the photoelectric conversion period) of the image sensor 200 other than the readout period of the image sensor 200. In these embodiments, a high voltage level of the overflow power voltage may be substantially the same as a voltage level of the second high power voltage applied to an electrode of the sensing transistor included in the unit pixel 211, and a low voltage level of the overflow power voltage may be substantially the same as a voltage level of a ground voltage. However, a voltage level of the overflow power voltage is not limited thereto. In some embodiments, a voltage level of the second high power voltage applied to the electrode of the sensing transistor included in the unit pixel 211 may be substantially the same as a voltage level of the first high power voltage applied to an electrode of the reset transistor included in the unit pixel 211. In some embodiments, a voltage level of the second high power voltage applied to the electrode of the sensing transistor included in the unit pixel 211 may be different from a voltage level of the first high power voltage applied to the electrode of the reset transistor included in the unit pixel 211.

In brief, the image sensor 200 may control the overflow power voltage applied to the electrode of the overflow transistor included in each unit pixel 211 to have a low voltage level in the photoelectric conversion period of the image sensor 200 and may control the overflow power voltage to have a high voltage level in the readout period of the image sensor 200. Thus, the image sensor 200 may prevent image quality degradation caused by a leakage current due to hot carrier generation flowing into the photoelectric conversion device through the overflow transistor even when the overflow transistor is turned off in the photoelectric conversion period of the image sensor 200. As illustrated in FIG. 5, the image sensor 200 may be connected to a display device 400 via a controller 300 (or, a processor). Thus, the display device 400 may display an image based on the final image signal output from the digital signal processing unit 240. Meanwhile, although it is illustrated in FIG. 4 that the overflow power voltage control unit 260 is separated (implemented independently) from the control unit 250, in some embodiments, the overflow power voltage control unit 260 may be located (implemented) inside the control unit 250. Furthermore, although it is illustrated in FIG. 4 that the digital signal processing unit 240 is included in the image sensor 200, the digital signal processing unit 240 may be located outside the image sensor 200. In some embodiments, the digital signal processing unit 240 may be implemented inside the controller 300. In some embodiments, the digital signal processing unit 240 may be implemented independently from the image sensor 200 and the controller 300.

Figure 6:
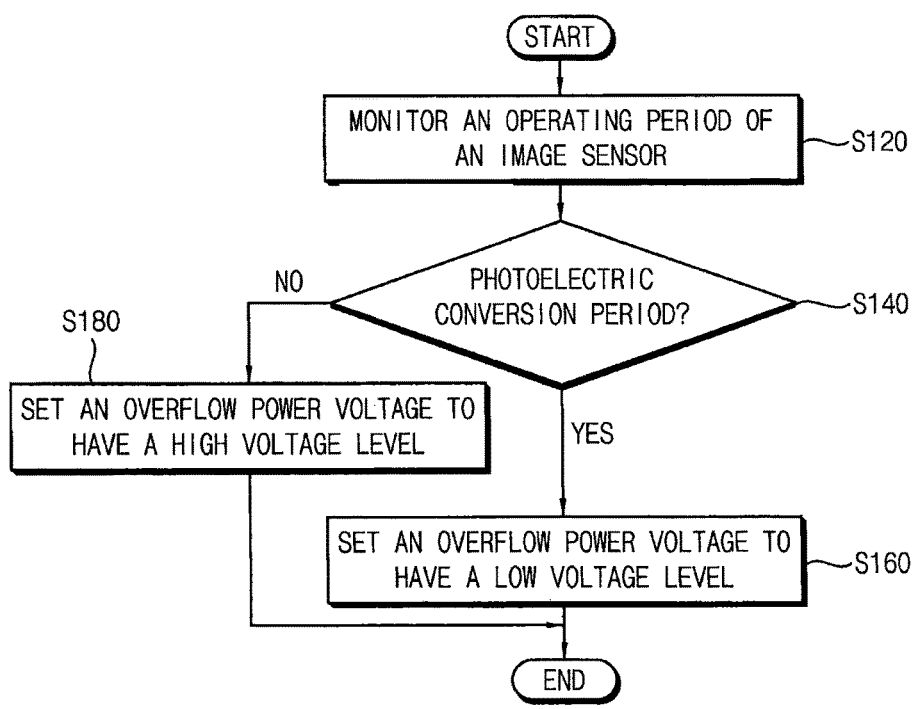
FIG. 6 is a flowchart illustrating a process for driving an image sensor according to some embodiments of the present inventive concept.
Figure 7:
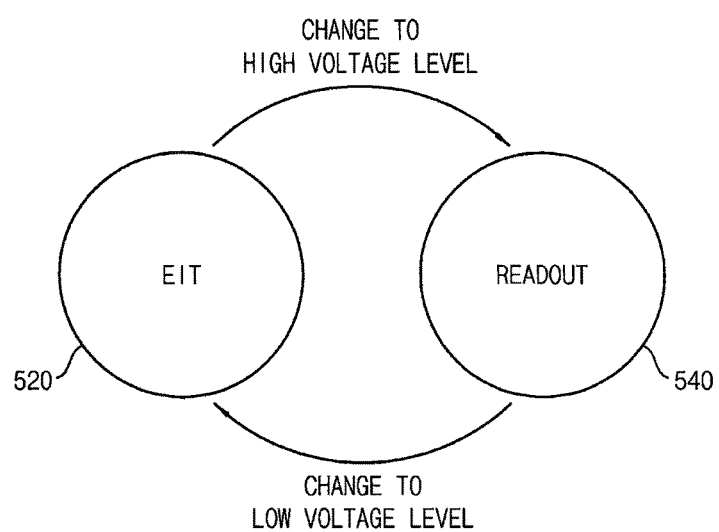
FIG. 7 is a diagram illustrating a photoelectric conversion period and a readout period of an image sensor that is driven according to the process discussed with respect to FIG. 6.

FIG. 6 is a flowchart illustrating processes for driving an image sensor according to some embodiments of the present inventive concept. FIG. 7 is a diagram illustrating a photoelectric conversion period and a readout period of an image sensor that is driven by the process of FIG. 6. Referring to FIGS. 6 and 7, the process illustrated in FIG. 6 may drive the image sensor (a global shutter image sensor) of which a unit pixel transfers accumulated charges generated by a photoelectric conversion device to a floating diffusion node through a charge storage device. In particular, process of FIG. 6 may monitor an operating period of the image sensor (S120) and may check whether the operating period of the image sensor is a photoelectric conversion period 520 (S140). In these embodiments, when the operating period of the image sensor is the photoelectric conversion period 520, the method of FIG. 6 may control an overflow power voltage applied to an electrode of an overflow transistor included in the unit pixel to have a low voltage level (S160). Thus, the overflow power voltage may be set to have a low voltage level in the photoelectric conversion period 520 of the image sensor. On the other hand, when the operating period of the image sensor is a readout period 540, the method of FIG. 6 may control the overflow power voltage applied to the electrode of the overflow transistor included in the unit pixel to have a high voltage level (S180). Thus, the overflow power voltage may be set to have a high voltage level in the readout period 540 of the image sensor. In other words, as illustrated in FIG. 7, when the operating period of the image sensor is changed from the photoelectric conversion period 520 to the readout period 540, a voltage level of the overflow power voltage may be changed from a low voltage level to a high voltage level (indicated as CHANGE TO HIGH VOLTAGE LEVEL). On the other hand, when the operating period of the image sensor is changed from the readout period 540 to the photoelectric conversion period 520, the voltage level of the overflow power voltage may be changed from a high voltage level to a low voltage level (indicated as CHANGE TO LOW VOLTAGE LEVEL). In some embodiments, the method of FIG. 6 may control the overflow power voltage to have a low power voltage in a non-readout period (including the photoelectric conversion period 520) of the image sensor other than the readout period 540 of the image sensor. Hereinafter, an operation that changes the overflow power voltage will be discussed in detail with reference to FIGS. 8 through 12.

Figure 8:
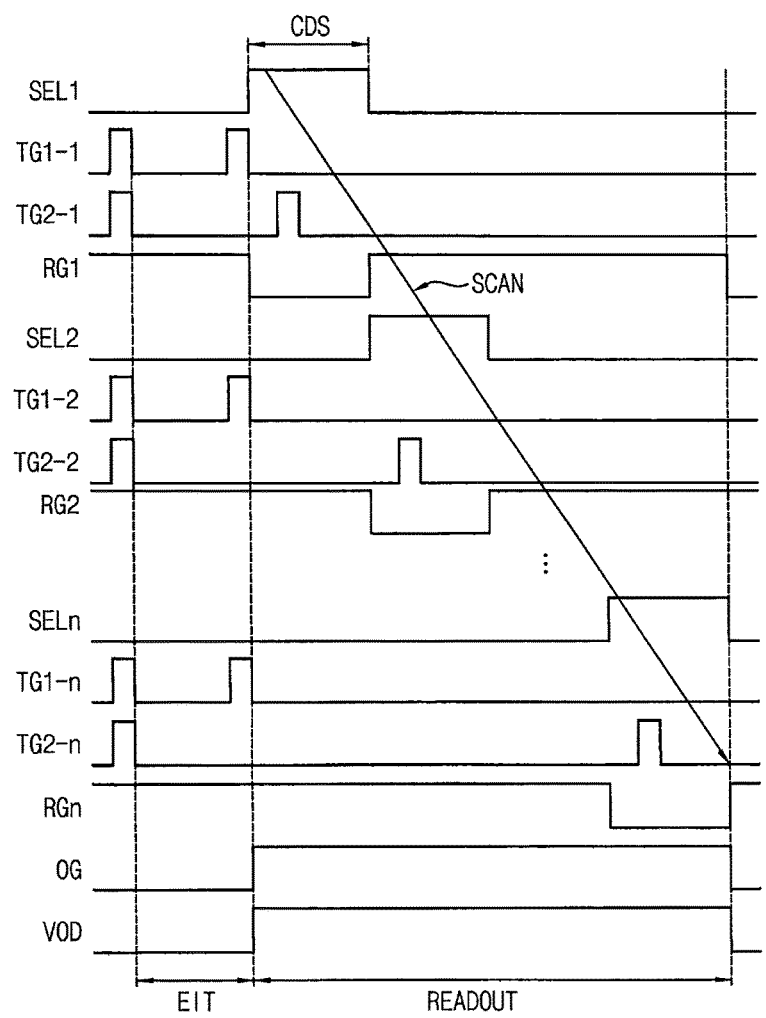
FIG. 8 is a timing diagram illustrating an example in which an overflow power voltage is changed according to the process discussed with respect to FIG. 6.
Figure 9:
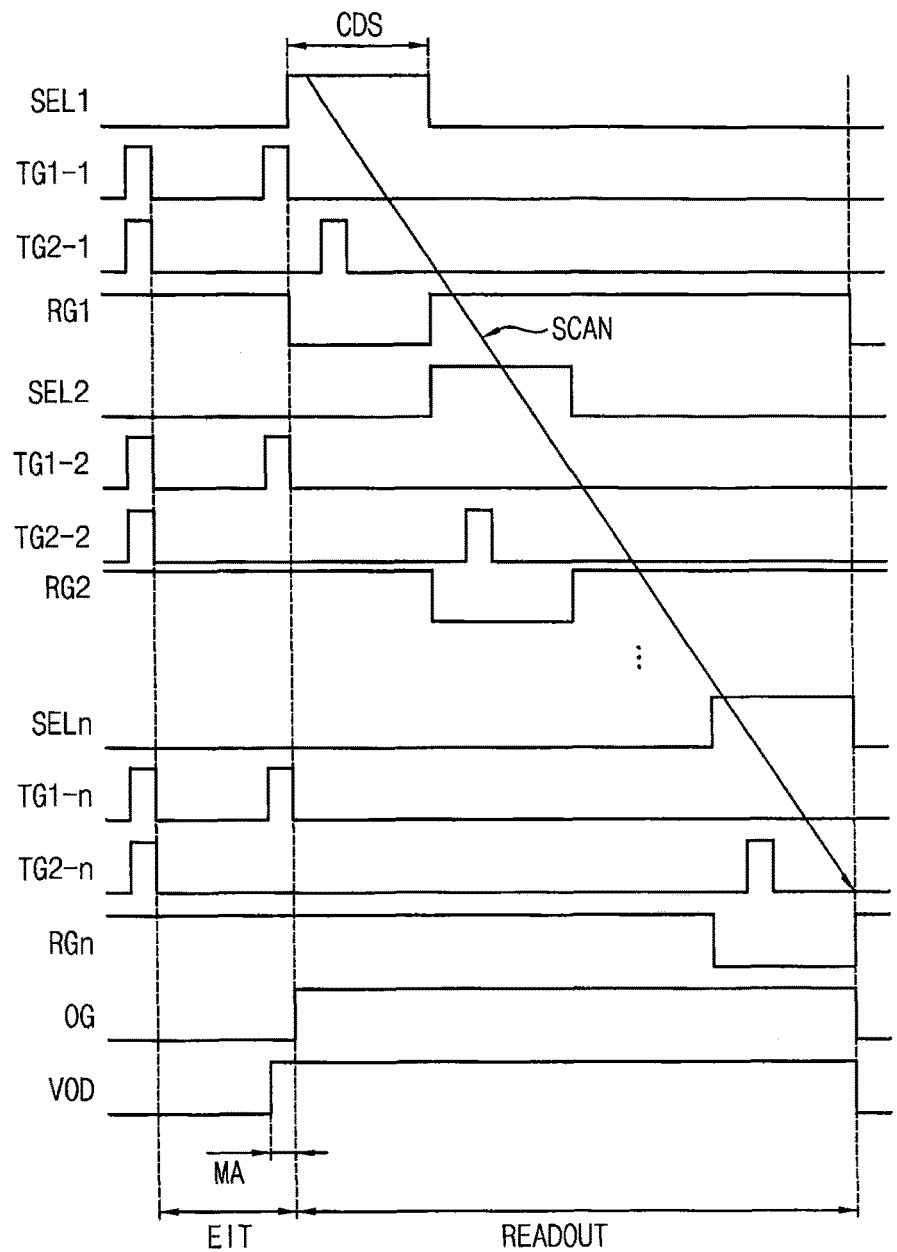
FIG. 9 is a timing diagram illustrating an example in which an overflow power voltage is changed the process discussed with respect to FIG. 6.

FIG. 8 is a timing diagram illustrating an example in which an overflow power voltage is changed by the method of FIG. 6. FIG. 9 is a timing diagram illustrating another example in which an overflow power voltage is changed by the method of FIG. 6.

Referring to FIGS. 1, 2, 8, and 9, the process of FIG. 6 may control the overflow power voltage VOD applied to an electrode of the overflow transistor OX included in each unit pixel 100 to have a low voltage level in the photoelectric conversion period EIT of the image sensor and may control the overflow power voltage VOD to have a high voltage level in the readout period READOUT of the image sensor. Thus, the method of FIG. 6 may prevent image quality degradation caused by a leakage current due to hot carrier generation flowing into the photoelectric conversion device PD through the overflow transistor OX even when the overflow transistor OX is turned off in the photoelectric conversion period EIT of the image sensor. In particular, the process illustrated in FIG. 6 may control the unit pixels 100 to concurrently transfer the accumulated charges ACG from the photoelectric conversion device PD to the charge storage device SD in the photoelectric conversion period EIT of the image sensor. In some embodiments, as illustrated in FIGS. 8 and 9, the method of FIG. 6 may turn on the first transfer transistor TX1, the second transfer transistor TX2, and the reset transistor RX by applying the first transfer signals TG1-1 through TG1-*n* having a first voltage level (e.g., logic 'high' level), the second transfer signals TG2-1 through TG2-*n* having a first voltage level (e.g., logic 'high' level), and the reset signals RG1 through RGn having a first voltage level (e.g., logic 'high' level) to the unit pixels 100 just before the readout period READOUT of the image sensor. Thus, the floating diffusion node FD, the charge storage device SD, and/or the photoelectric conversion device PD may be reset (or, initialized) in the unit pixels 100.

Subsequently, the method of FIG. 6 may turn off the first transfer transistor TX1 and the second transfer transistor TX2 by applying the first transfer signals TG1-1 through TG1-*n* having a second voltage level (e.g., logic 'low' level) and the second transfer signals TG2-1 through TG2-*n* having a second voltage level (e.g., logic 'low' level) to the unit pixels 100 in the photoelectric conversion period EIT of the image sensor. Thus, the unit pixels 100 (the photoelectric conversion devices PD of the unit pixels 100) may convert the incident light LIG into charges and may generate the accumulated charges ACG by accumulating the charges. Next, when the accumulated charges ACG are generated by the photoelectric conversion devices PD in the unit pixels 100, the method of FIG. 6 may turn on the first transfer transistor TX1 and may turn off the second transfer transistor TX2 by applying the first transfer signals TG1-1 through TG1-*n* having a first voltage level (e.g., logic 'high' level) and the second transfer signals TG2-1 through TG2-*n* having a second voltage level (e.g., logic 'low' level) to the unit pixels 100. Thus, the accumulated charges ACG generated by the photoelectric conversion devices PD may be transferred to the charge storage devices SD in the unit pixels 100. In some embodiments, when the accumulated charges ACG are stored in the charge storage devices SD in the unit pixels 100, the method of FIG. 6 may turn off the first transfer transistor TX1 and may turn on the second transfer transistor TX2 and the reset transistor RX by applying the first transfer signals TG1-1 through TG1-*n* having a second voltage level (e.g., logic 'low' level), the second transfer signals TG2-1 through TG2-*n* having a first voltage level (e.g., logic 'high' level), and the reset signals RG1 through RGn having a first voltage level (e.g., logic 'high' level) to the unit pixels 100. Thus, the floating diffusion node FD and the charge storage device SD may be reset in the unit pixels 100, so that the readout period READOUT of the image sensor may be prepared in the unit pixels 100.

Next, the method of FIG. 6 may read out an image signal by sequentially performing a correlated double sampling operation on the unit pixels 100 according to scan sequences of the unit pixels 100 (according to scan-lines connected to the unit pixels 100) in the readout period READOUT of the image sensor (indicated as SCAN). In other words, a correlated double sampling period CDS during which the correlated double sampling operation is performed may be shifted in every scan-line connected to the unit pixels 100. For example, when the image sensor includes first through (n)th scan-lines, where n is an integer greater than or equal to 2, the readout period READOUT of the image sensor may correspond to a time during which the correlated double sampling operation is all completed (or, finished) on the first through (n)th scan-lines. Furthermore, the correlated double sampling period CDS for the (j)th scan-line, where j is an integer between 1 and n, may correspond to a time during which a (j)th row select signal SELj having a first voltage level (e.g., logic 'high' level) is applied to the unit pixels 100 connected to the (j)th scan-line. In some embodiments, the method of FIG. 6 may turn on the select transistor SX and may turn off the reset transistor RX by applying the (j)th row select signal SELj having a first voltage level (e.g., logic 'high' level) and the (j)th reset signal RGj having a second voltage level (e.g., logic 'low' level) to the unit pixels 100 connected to the (j)th scan-line in the correlated double sampling period CDS during which the correlated double sampling operation is performed on the (j)th scan-line. In these embodiments, since an effective signal component (e.g., a difference between a signal component and a reset component) is extracted based on the reset component and the signal component that are output from the unit pixel 100 when the correlated double sampling operation is performed on the unit pixel 100, the correlated double sampling operation may include a reset component output operation for outputting the reset component and a signal component output operation for outputting the signal component. Therefore, when the correlated double sampling operation is performed on the (j)th scan-line in the correlated double sampling period CDS, the reset component output operation may be performed before the second transfer signal TG2-*j* having a first voltage level (e.g., logic 'high' level) is applied to the unit pixels 100 connected to the (j)th scan-line, and the signal component output operation may be performed after the second transfer signal TG2-*j* having a first voltage level (e.g., logic 'high' level) is applied to the unit pixels 100 connected to the (j)th scan-line. In other words, when the second transfer signal TG2-*j* having a first voltage level (e.g., logic 'high' level) is applied to the unit pixels 100 connected to the (j)th scan-line, the accumulated charges ACG stored in the charge storage devices SD may be transferred to the floating diffusion nodes FD in the unit pixels 100 connected to the (j)th scan-line.

As discussed above, the method of FIG. 6 may control the overflow power voltage VOD applied to the electrode of the overflow transistor OX to have a low voltage level in the photoelectric conversion period EIT of the image sensor and may control the overflow power voltage VOD applied to the electrode of the overflow transistor OX to have a high voltage level in the readout period READOUT of the image sensor. In some embodiments, as illustrated in FIG. 8, a voltage level of the overflow power voltage VOD may be changed from a low voltage level to a high voltage level in the unit pixels 100 at a timing point at which the overflow transistor OX is turned on based on the overflow signal OG in the unit pixels 100 (a timing point at which a voltage level of the overflow signal OG is changed from a low voltage level to a high voltage level in the unit pixels 100). In other words, the timing point at which the voltage level of the overflow signal OG is changed from a low voltage level to a high voltage level may be consistent with the timing point at which the voltage level of the overflow power voltage VOD is changed from a low voltage level to a high voltage level. In some embodiments, as illustrated in FIG. 9, the voltage level of the overflow power voltage VOD may be changed from a low voltage level to a high voltage level in the unit pixels 100 before the timing point at which the overflow transistor OX is turned on based on the overflow signal OG in the unit pixels 100 (the timing point at which the voltage level of the overflow signal OG is changed from a low voltage level to a high voltage level in the unit pixels 100). In other words, since a relatively large RC delay exists when the voltage level of the overflow power voltage VOD is changed from a low voltage level to a high voltage level, the voltage level of the overflow power voltage VOD may be changed from a low voltage level to a high voltage level at a timing point that is earlier than the timing point at which the overflow transistor OX is turned on based on the overflow signal OG by a predetermined time margin MA corresponding to the RC delay (e.g., a few microseconds (μs).

Figure 10:
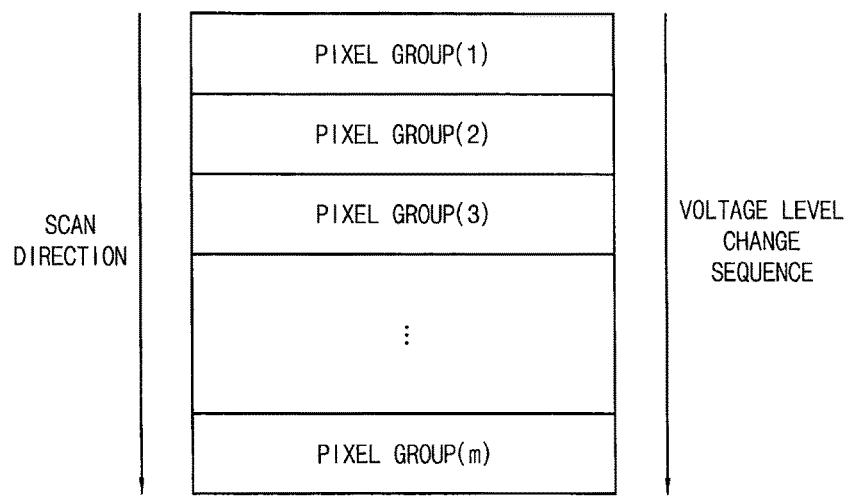
FIG. 10 is a timing diagram illustrating an example in which an overflow power voltage is changed according to the process discussed with respect to FIG. 6.
Figure 11:
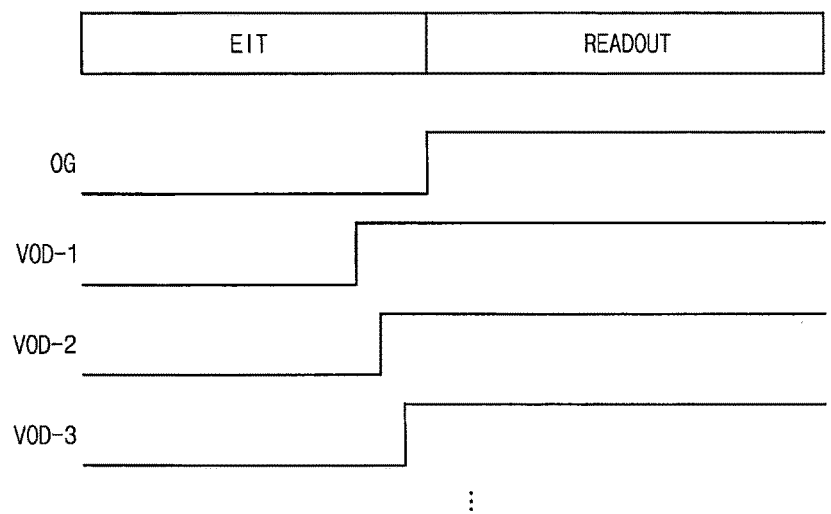
FIG. 11 is a timing diagram illustrating an example in which an overflow power voltage is changed by the method of FIG. 6.

FIG. 10 is a timing diagram illustrating still another example in which an overflow power voltage is changed by the method of FIG. 6. FIG. 11 is a timing diagram illustrating still another example in which an overflow power voltage is changed by the method of FIG. 6.

Referring to FIGS. 1, 2, 10, and 11, the method of FIG. 6 may control the overflow power voltage VOD applied to the electrode of the overflow transistor OX included in each unit pixel 100 to have a low voltage level in the photoelectric conversion period EIT of the image sensor and may control the overflow power voltage VOD to have a high voltage level in the readout period READOUT of the image sensor. In these embodiments, the method of FIG. 6 may form first through (m)th pixel groups PIXEL GROUP(1) through PIXEL GROUP(m), where m is an integer greater than or equal to 2, by grouping the unit pixels 100 and may separately control the first through (m)th pixel groups PIXEL GROUP(1) through PIXEL GROUP(m). In some embodiments, the unit pixels 100 may be grouped according to a scan direction (indicated as SCAN DIRECTION). In other words, the first through (m)th pixel groups PIXEL GROUP(1) through PIXEL GROUP(m) may be arranged in the scan direction (indicated as SCAN DIRECTION). For example, each of the first through (m)th pixel groups PIXEL GROUP(1) through PIXEL GROUP(m) may include the unit pixels 100 connected to a few scan-lines. In particular, the method of FIG. 6 may control voltage levels of the first through (m)th overflow power voltages VOD-1 through VOD-m to be changed from a low voltage level to a high voltage level for each of the first through (m)th pixel groups PIXEL GROUP(1) through PIXEL GROUP(m) at respective timing points that are earlier than the timing point at which the overflow transistor OX is turned on based on the overflow signal OG in the unit pixels 100 (the timing point at which the voltage level of the overflow signal OG is changed from a low voltage level to a high voltage level). For example, as illustrated in FIG. 10, assuming that a voltage level change sequence of the first through (m)th overflow power voltages VOD-1 through VOD-m is from top to bottom (indicated as VOLTAGE LEVEL CHANGE SEQUENCE), the voltage level of the second overflow power voltage VOD-2 applied to the second pixel group PIXEL GROUP(2) may be changed from a low voltage level to a high voltage level after the voltage level of the first overflow power voltage VOD-1 applied to the first pixel group PIXEL GROUP(1) is changed from a low voltage level to a high voltage level. Furthermore, the voltage level of the third overflow power voltage VOD-3 applied to the third pixel group PIXEL GROUP(3) may be changed from a low voltage level to a high voltage level after the voltage level of the second overflow power voltage VOD-2 applied to the second pixel group PIXEL GROUP(2) is changed from a low voltage level to a high voltage level. In this way, the voltage level of the (m)th overflow power voltage VOD-m applied to the (m)th pixel group PIXEL GROUP(m) may be changed from a low voltage level to a high voltage level after the voltage level of the (m−1)th overflow power voltage VOD-m−1 applied to the (m−1)th pixel group PIXEL GROUP(m−1) is changed from a low voltage level to a high voltage level. In brief, by sequentially changing the voltage levels of the first through (m)th overflow power voltages VOD-1 through VOD-m that are applied to the first through (m)th pixel groups PIXEL GROUP(1) through PIXEL GROUP(m), respectively, the method of FIG. 6 may prevent an instantaneous peak current that is caused when the voltage levels of the first through (m)th overflow power voltages VOD-1 through VOD-m are concurrently changed.

Figure 12:
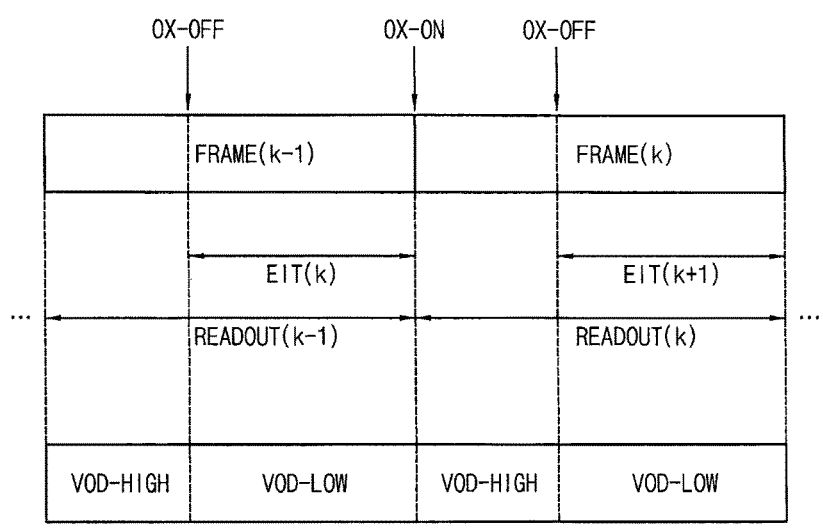
FIG. 12 is a timing diagram illustrating still another example in which an overflow power voltage is changed according to the process discussed with respect to FIG. 6.

FIG. 12 is a timing diagram illustrating still another example in which an overflow power voltage is changed by the method of FIG. 6.

Referring to FIGS. 1, 2, and 12, the method of FIG. 6 may also be applied to a technique (e.g., referred to as a pipelined global shutter technique) that resets (or, initializes) the photoelectric conversion device PD by using the overflow transistor OX. The pipelined global shutter technique of FIG. 12 may perform the photoelectric conversion period EIT of the image sensor and the readout period READOUT of the image sensor in parallel. Thus, compared to a technique that resets the photoelectric conversion device PD by turning on the first transfer transistor TX1, the second transfer transistor TX2, and the reset transistor RX (sequentially performs the photoelectric conversion period EIT of the image sensor and the readout period READOUT of the image sensor), the pipelined global shutter technique of FIG. 12 may achieve a sufficient frame per second (fps). In particular, in the pipelined global shutter technique of FIG. 12, when the (k−1)th frame FRAME(k−1) is sensed, the readout period READOUT(k−1) for the (k−1)th frame FRAME(k−1) may overlap the photoelectric conversion period EIT(k) for the (k)th frame FRAME(k) that is a next frame of the (k−1)th frame FRAME(k−1). Similarly, in the pipelined global shutter technique of FIG. 12, when the (k)th frame FRAME(k) is sensed, the readout period READOUT (k) for the (k)th frame FRAME(k) may overlap the photoelectric conversion period EIT(k+1) for the (k+1)th frame FRAME(k+1) that is a next frame of the (k)th frame FRAME(k). In other words, since an image sensor employing the pipelined global shutter technique of FIG. 12 resets the photoelectric conversion device PD by separating the photoelectric conversion device PD from the charge storage device SD using the first transfer transistor TX1 (the first transfer transistor TX1 is turned off) and by turning on the overflow transistor OX in the unit pixel 100, the image sensor may concurrently perform the readout operation for the (k−1)th frame FRAME(k−1) and the photoelectric conversion operation for the (k)th frame FRAME(k), and may concurrently perform the readout operation for the (k)th frame FRAME(k) and the photoelectric conversion operation for the (k+1)th frame FRAME(k+1).

In these embodiments, the method of FIG. 6 may be applied to the pipelined global shutter technique of FIG. 12. In particular, the method of FIG. 6 may control an overflow power voltage VOD applied to an electrode of the overflow transistor OX to have a high voltage level (indicated as VOD-HIGH) until the overflow transistor OX is turned off (indicated as OX-OFF) in the (k−1)th frame FRAME(k−1) and may control the overflow power voltage VOD to have a low voltage level (indicated as VOD-LOW) after the overflow transistor OX is turned off (indicated as OX-OFF) in the (k−1)th frame FRAME(k−1). Subsequently, when the overflow transistor OX is turned on (indicated as OX-ON) as the (k)th frame FRAME(k) is sensed, the method of FIG. 6 may control the overflow power voltage VOD to have a high voltage level (indicated as VOD-HIGH) until the overflow transistor OX is turned off (indicated as OX-OFF) in the (k)th frame FRAME(k) and may control the overflow power voltage VOD to have a low voltage level (indicated as VOD-LOW) after the overflow transistor OX is turned off (indicated as OX-OFF) in the (k)th frame FRAME(k). As discussed above, in the pipelined global shutter technique of FIG. 12, the method of FIG. 6 may prevent image quality degradation caused by a leakage current due to hot carrier generation flowing into the photoelectric conversion device PD through the overflow transistor OX even when the overflow transistor OX is turned off in the photoelectric conversion period EIT of the image sensor by controlling the overflow power voltage VOD applied to the electrode of the overflow transistor OX included in each unit pixel 100 to have a low voltage level in the photoelectric conversion period EIT of the image sensor (indicated as VOD-LOW) and by controlling the overflow power voltage VOD to have a high voltage level in the readout period READOUT of the image sensor (indicated as VOD-HIGH).

Figure 13:
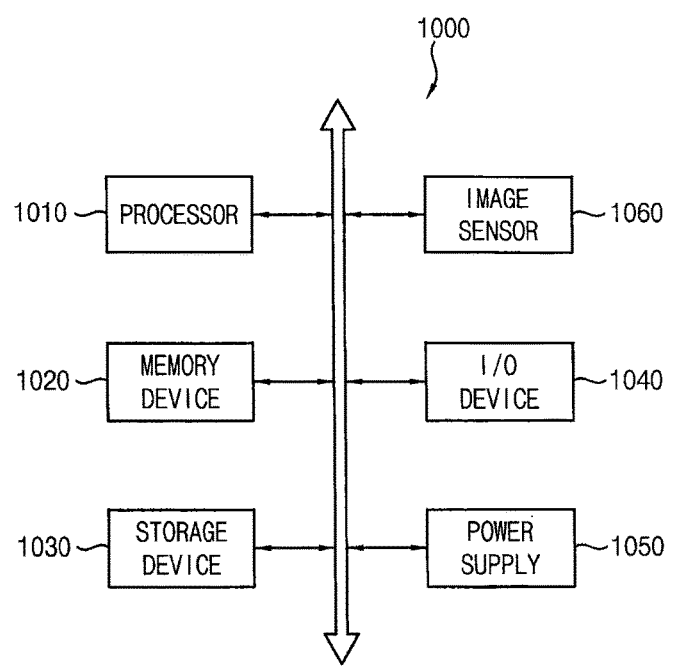
FIG. 13 is a block diagram illustrating a portable electronic device according to some embodiments of the present inventive concept.
Figure 14A:
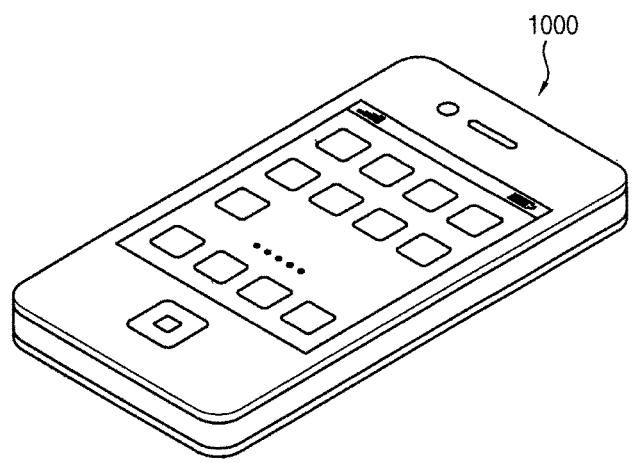
FIG. 14A is a diagram illustrating an example in which the portable electronic device of FIG. 13 is implemented as a smart phone.
Figure 14B:
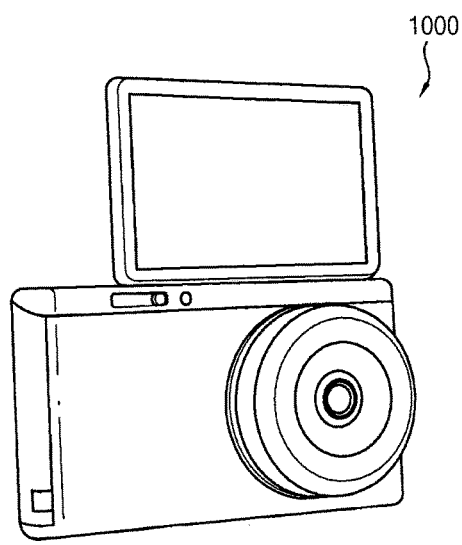
FIG. 14B is a diagram illustrating an example in which the portable electronic device of FIG. 13 is implemented as a digital camera.

FIG. 13 is a block diagram illustrating a portable electronic device according to some embodiments of the present inventive concept. FIG. 14A is a diagram illustrating an example in which the portable electronic device of FIG. 13 is implemented as a smart phone. FIG. 14B is a diagram illustrating an example in which the portable electronic device of FIG. 13 is implemented as a digital camera.

Referring to FIGS. 13 through 14B, the portable electronic device 1000 may include a processor 1010, a memory device 1020, a storage device 1030, an input/output (I/O) device 1040, a power supply 1050, and an image sensor (a global shutter image sensor) 1060. In these embodiments, the image sensor 1060 may correspond to the image sensor 200 of FIG. 4. Furthermore, the portable electronic device 1000 may further include a plurality of ports for communicating a video card, a sound card, a memory card, a universal serial bus (USB) device, other electronic devices, etc. In some embodiments, as illustrated in FIG. 14A, the portable electronic device 1000 may be implemented as a smart phone. In some embodiments, as illustrated in FIG. 14B, the portable electronic device 1000 may be implemented as a digital camera. In these embodiments, the portable electronic device 1000 may prevent image quality degradation caused by a light noise (e.g., a leakage current due to hot carrier generation) by including the image sensor 1060 (the image sensor 200 of FIG. 4).

The processor 1010 may perform various computing functions. The processor 1010 may be a micro-processor, a central processing unit (CPU), an application processor (AP), etc. The processor 1010 may be coupled to other components via an address bus, a control bus, a data bus, etc. In some embodiments, the processor 1010 may be coupled to an extended bus such as a peripheral component interconnection (PCI) bus. The memory device 1020 may store data for operations of the portable electronic device 1000. For example, the memory device 1020 may include a volatile semiconductor memory device such as a dynamic random access memory (DRAM) device, a static random access memory (SRAM) device, a mobile DRAM, etc, and/or a non-volatile semiconductor memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. The storage device 1030 may include a solid state drive (SSD) device, a hard disk drive (HDD) device, a CD-ROM device, etc.

The I/O device 1040 may include an input device such as a keyboard, a keypad, a touchpad, a touch-screen, a mouse device, etc and an output device such as a display device, a printer, a speaker, etc. The power supply 1050 may provide power for operations of the portable electronic device 1000. The image sensor 1060 may be coupled to other components via the buses or other communication links. As discussed above, the image sensor 1060 may control an overflow power voltage applied to an electrode of an overflow transistor included in each unit pixel to have a low voltage level in a photoelectric conversion period of the image sensor 1060 and may control the overflow power voltage to have a high voltage level in a readout period of the image sensor 1060. Thus, the image sensor 1060 may prevent image quality degradation caused by a leakage current due to hot carrier generation flowing into the photoelectric conversion device through the overflow transistor even when the overflow transistor is turned off in the photoelectric conversion period of the image sensor 1060. For this operation, the image sensor 1060 may include a pixel array, a correlated double sampling unit, an analog-digital converting unit, a control unit, and an overflow power voltage control unit. The pixel array may include at least one unit pixel that generates accumulated charges corresponding to incident light in the photoelectric conversion period of the image sensor 1060 and outputs an analog signal based on the accumulated charges in the readout period of the image sensor 1060. In some embodiments, the unit pixel may include the photoelectric conversion device, the charge storage device, a first transfer transistor, a second transfer transistor, a reset transistor, a sensing transistor, a select transistor, and the overflow transistor. The photoelectric conversion device may convert the incident light into charges and may generate the accumulated charges by accumulating the charges. The charge storage device may store the accumulated charges generated by the photoelectric conversion device. The first transfer transistor may be connected between the photoelectric conversion device and the charge storage device. The first transfer transistor may operate based on a first transfer signal. The second transfer transistor may be connected between the charge storage device and the floating diffusion node. The second transfer transistor may operate based on a second transfer signal. The reset transistor may be connected between the floating diffusion node and a first high power voltage. The reset transistor may operate based on a reset signal. The sensing transistor may be connected to a second high power voltage. The sensing transistor may operate based on the accumulated charges that are transferred to the floating diffusion node. The select transistor may be connected between the sensing transistor and an output terminal. The select transistor may operate based on a row select signal. The overflow transistor may be connected between the overflow power voltage and the photoelectric conversion device. The overflow transistor may operate based on an overflow signal. In these embodiments, the overflow power voltage may have a low voltage level in the photoelectric conversion period of the image sensor 1060 and may have a high voltage level in the readout period of the image sensor 1060. The correlated double sampling unit may generate an image signal by performing a correlated double sampling operation on the analog signal output from the unit pixel. The analog-digital converting unit may convert the image signal into the digital signal. The control unit may control the pixel array, the correlated double sampling unit, and the analog-digital converting unit. The overflow power voltage control unit may control the overflow power voltage to have a low voltage level in the photoelectric conversion period of the image sensor 1060 and may control the overflow power voltage to have a high voltage level in the readout period of the image sensor 1060. In some embodiments, the overflow power voltage control unit may be located (or, implemented) outside the control unit. In some embodiments, the overflow power voltage control unit may be located inside the control unit. In some embodiments, the image sensor 1060 may further include a digital signal processing unit. In some embodiments, the digital signal processing unit may be located (or, implemented) outside the image sensor 1060. In some embodiments, the digital signal processing unit may be located inside the image sensor 1060.

In some embodiments, the image sensor 1060 may be implemented by various packages such as Package on Package (PoP), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flat-Pack (TQFP), Small Outline Integrated Circuit (SOIC), Shrink Small Outline Package (SSOP), Thin Small Outline Package (TSOP), Thin Quad Flat-Pack (TQFP), System In Package (SIP), Multi Chip Package (MCP), Wafer-level Fabricated Package (WFP), Wafer-Level Processed Stack Package (WSP). As discussed above, the portable electronic device 1000 including the image sensor 1060 may output a high-quality image. In some embodiments, the image sensor 1060 and the processor 1010 may be integrated in one chip. In some embodiments, the image sensor 1060 and the processor 1010 may be integrated in different chips, respectively. Although it is illustrated in FIGS. 14A and 14B that the portable electronic device 1000 is implemented as the smart phone or the digital camera (e.g., a mirror-less digital camera, etc), the portable electronic device 1000 is not limited thereto. In other words, the portable electronic device 1000 should be interpreted as any electronic device including (or, using) the image sensor 1060. For example, the portable electronic device 1000 may be implemented as a cellular phone, a smart pad, a personal digital assistant (PDA), a portable multimedia player (PMP), etc.

Figure 15:
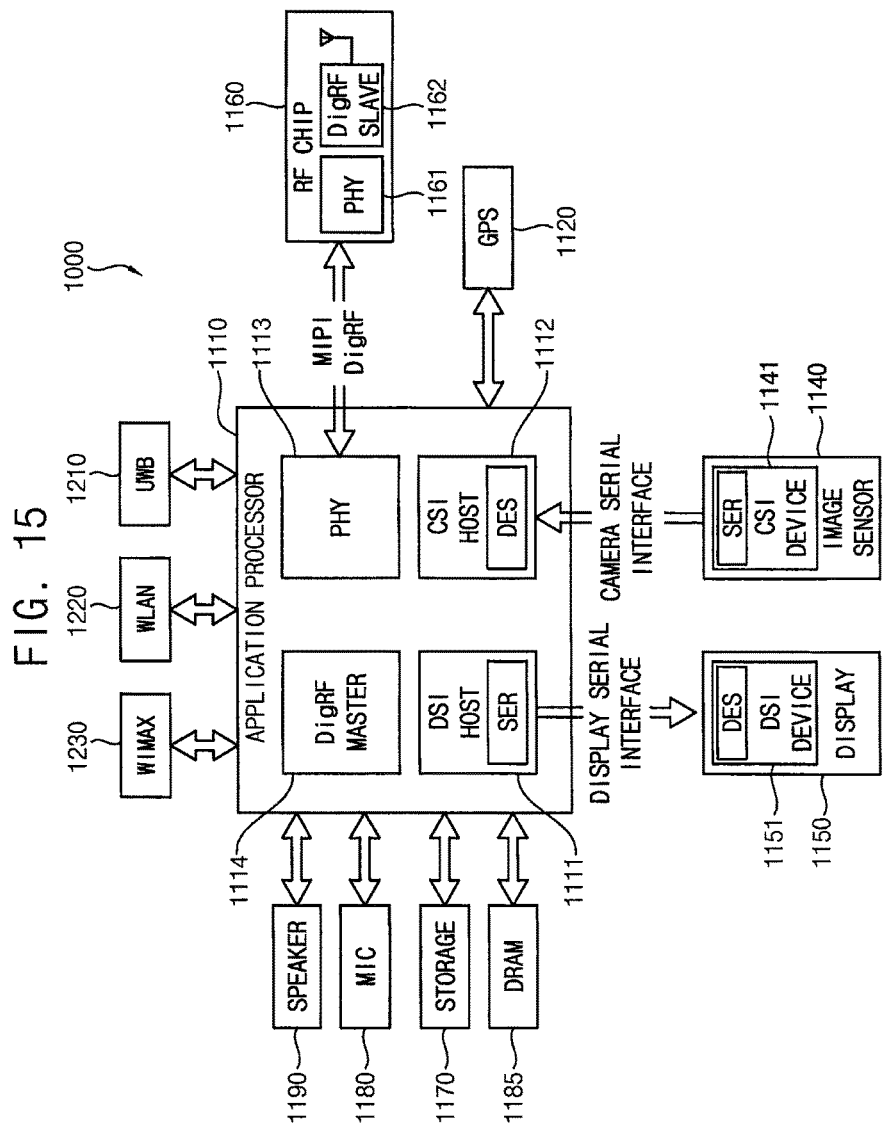
FIG. 15 is a block diagram illustrating an example of an interface that is used in the portable electronic device of FIG. 13.

FIG. 15 is a block diagram illustrating an example of an interface that is used in the portable electronic device of FIG. 13. As illustrated in FIG. 15, the portable electronic device 1000 may be implemented by a data processing device that uses or supports a mobile industry processor interface (MIPI) interface (e.g., a cellular phone, a personal digital assistant (PDA), a portable multimedia player (PMP), a smart phone, etc). The portable electronic device 1000 may include an application processor 1010, an image sensor 1140, a display device 1150, and other various input/output devices discussed in detail below. A CSI host 1112 of the application processor 1110 may perform a serial communication with a CSI device 1141 of the image sensor 1140 using a camera serial interface (CSI). In some embodiments, the CSI host 1112 may include a light deserializer (DES), and the CSI device 1141 may include a light serializer (SER). A DSI host 1111 of the application processor 1110 may perform a serial communication with a DSI device 1151 of the display device 1150 using a display serial interface (DSI). In some embodiments, the DSI host 1111 may include a light serializer (SER), and the DSI device 1151 may include a light deserializer (DES). The portable electronic device 1000 may further include a radio frequency (RF) chip 1160. The RF chip 1160 may perform a communication with the application processor 1110. A physical layer (PHY) 1113 of the portable electronic device 1000 and a physical layer (PHY) 1161 of the RF chip 1160 may perform data communications based on a MIPI DigRF. The application processor 1110 may further include a DigRF MASTER 1114 that controls the data communications of the PHY 1161. The portable electronic device 1000 may include a global positioning system (GPS) 1120, a storage 1170, a MIC 1180, a DRAM device 1185, and a speaker 1190. The portable electronic device 1000 may perform communications using an ultra wideband (UWB) 1210, a wireless local area network (WLAN) 1220, a worldwide interoperability for microwave access (WIMAX) 1130, etc. However, an interface of the portable electronic device 1000 is not limited thereto.

The present inventive concept may be applied to an image sensor (a global shutter image sensor) and an electronic device including the image sensor. For example, the present inventive concept may be applied to a computer, a laptop, a digital camera (e.g., a mirror-less digital camera, etc), a cellular phone, a smart phone, a smart pad, a tablet PC, a personal digital assistant (PDA), a portable multimedia player (PMP), a car navigation system, a video phone, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An image sensor comprising:
  a pixel array including at least one unit pixel that generates accumulated charges corresponding to incident light in a photoelectric conversion period and that outputs an analog signal based on the accumulated charges in a readout period;
  a correlated double sampling unit configured to generate an image signal by performing a correlated double sampling operation on the analog signal;
  an analog-digital converting unit configured to convert the image signal into a digital signal;
  a control unit configured to control the pixel array, the correlated double sampling unit, and the analog-digital converting unit; and
  an overflow power voltage control unit configured to control an overflow power voltage applied to an electrode of an overflow transistor included in the unit pixel to have a low voltage level in the photoelectric conversion period and to control the overflow power voltage to have a high voltage level in the readout period.

2. The image sensor of claim 1, wherein the overflow power voltage control unit is in the control unit.

3. The image sensor of claim 1, wherein the overflow power voltage control unit controls the overflow power voltage to have the low voltage level in a non-readout period other than the readout period.

4. The image sensor of claim 1, further comprising a digital signal processing unit configured to output a final image signal by performing a digital signal processing on the digital signal.

5. The image sensor of claim 1, wherein the unit pixel includes:
  a photoelectric conversion block configured to generate the accumulated charges in the photoelectric conversion period;
  an analog signal output block configured to output the analog signal based on the accumulated charges in the readout period; and
  an overflow prevention block configured to prevent an overflow from occurring in the photoelectric conversion block using the overflow power voltage in the readout period.

6. The image sensor of claim 5, wherein the overflow prevention block includes the overflow transistor connected between the overflow power voltage and the photoelectric conversion block and configured to operate based on an overflow signal.

7. The image sensor of claim 6, wherein a voltage level of the overflow power voltage is changed from the low voltage level to the high voltage level at a timing point at which the overflow transistor is turned on based on the overflow signal in the unit pixel.

8. The image sensor of claim 6, wherein a voltage level of the overflow power voltage is changed from the low voltage level to the high voltage level at a timing point that is earlier than a timing point at which the overflow transistor is turned on based on the overflow signal in the unit pixel.

9. The image sensor of claim 6, wherein a voltage level of the overflow power voltage is changed from the low voltage level to the high voltage level at respective timing points that are earlier than a timing point at which the overflow transistor is turned on based on the overflow signal in respective pixel groups.

10. The image sensor of claim 6, wherein the photoelectric conversion block includes:
  a photoelectric conversion device configured to convert the incident light into charges and to generate the accumulated charges by accumulating the charges;
  a charge storage device configured to store the accumulated charges;
  a first transfer transistor connected between the photoelectric conversion device and the charge storage device and configured to operate based on a first transfer signal; and
  a second transfer transistor connected between the charge storage device and a floating diffusion node of the analog signal output block and configured to operate based on a second transfer signal.

11. The image sensor of claim 10, wherein the analog signal output block includes:
  a reset transistor connected between the floating diffusion node and a first high power voltage and configured to operate based on a reset signal;
  a sensing transistor connected to a second high power voltage and configured to operate based on the accumulated charges that are transferred to the floating diffusion node; and
  a select transistor connected between the sensing transistor and an output terminal and configured to operate based on a row select signal.

12. The image sensor of claim 11:
  wherein the high voltage level is substantially the same as a voltage level of the second high power voltage when the overflow power voltage has the high voltage level; and
  wherein the low voltage level is substantially the same as a voltage level of a ground voltage when the overflow power voltage has the low voltage level.

13. A portable electronic device comprising:
  a global shutter image sensor;
  a display device configured to display an image based on a final image signal input from the global shutter image sensor; and
  a processor configured to control the global shutter image sensor and the display device, wherein the global shutter image sensor includes:
  a pixel array including at least one unit pixel that generates accumulated charges corresponding to incident light in a photoelectric conversion period and that outputs an analog signal based on the accumulated charges in a readout period;
  a correlated double sampling unit configured to generate an image signal by performing a correlated double sampling operation on the analog signal;
  an analog-digital converting unit configured to convert the image signal into a digital signal;
  a control unit configured to control the pixel array, the correlated double sampling unit, and the analog-digital converting unit; and
  an overflow power voltage control unit configured to control an overflow power voltage applied to an electrode of an overflow transistor included in the unit pixel to have a low voltage level in the photoelectric conversion period and to control the overflow power voltage to have a high voltage level in the readout period.

14. The portable electronic device of claim 13, wherein the overflow power voltage control unit is in the control unit.

15. The portable electronic device of claim 13, wherein the overflow power voltage control unit controls the overflow power voltage to have the low voltage level in a non-readout period other than the readout period.

16. The portable electronic device of claim 15, wherein the unit pixel includes:
  a photoelectric conversion device configured to convert the incident light into charges and to generate the accumulated charges by accumulating the charges;
  a charge storage device configured to store the accumulated charges;
  a first transfer transistor connected between the photoelectric conversion device and the charge storage device and configured to operate based on a first transfer signal;
  a second transfer transistor connected between the charge storage device and a floating diffusion node and configured to operate based on a second transfer signal;
  a reset transistor connected between the floating diffusion node and a first high power voltage and configured to operate based on a reset signal;
  a sensing transistor connected to a second high power voltage and configured to operate based on the accumulated charges that are transferred to the floating diffusion node;
  a select transistor connected between the sensing transistor and an output terminal and configured to operate based on a row select signal; and
  the overflow transistor connected between the overflow power voltage and the photoelectric conversion device and configured to operate based on an overflow signal.

17. The portable electronic device of claim 16, wherein a voltage level of the overflow power voltage is changed from the low voltage level to the high voltage level at a timing point at which the overflow transistor is turned on based on the overflow signal in the unit pixel.

18. The portable electronic device of claim 16, wherein a voltage level of the overflow power voltage is changed from the low voltage level to the high voltage level at a timing point that is earlier than a timing point at which the overflow transistor is turned on based on the overflow signal in the unit pixel.

19. The portable electronic device of claim 16, wherein a voltage level of the overflow power voltage is changed from the low voltage level to the high voltage level at respective timing points that are earlier than a timing point at which the overflow transistor is turned on based on the overflow signal in respective pixel groups.

20. The portable electronic device of claim 16:
  wherein the high voltage level is substantially the same as a voltage level of the second high power voltage when the overflow power voltage has the high voltage level; and
  wherein the low voltage level is substantially the same as a voltage level of a ground voltage when the overflow power voltage has the low voltage level.

* * * * *